United States Patent [19]
Cascallana

[11] Patent Number: 4,559,892
[45] Date of Patent: Dec. 24, 1985

[54] AMPHIBIOUS VEHICLE

[76] Inventor: Raul S. Cascallana, C/ Bergantin, 31 - Vista Hermosa - Puerto de Santa Maria (Cadiz), Spain

[21] Appl. No.: 538,974

[22] Filed: Oct. 4, 1983

[30] Foreign Application Priority Data

Oct. 15, 1982 [ES] Spain .................................. 267.864
Jul. 7, 1983 [ES] Spain .................................. 273.356

[51] Int. Cl.⁴ ............................................. B60F 3/00
[52] U.S. Cl. .................................. 114/270; 280/261; 440/30
[58] Field of Search ...................... 114/270, 344, 123; 440/12, 26, 29, 30; 280/261

[56] References Cited

U.S. PATENT DOCUMENTS

| | | | |
|---|---|---|---|
| 1,387,771 | 8/1921 | Eklund | 280/261 |
| 1,453,046 | 4/1923 | Gabke | 280/261 |
| 2,602,677 | 7/1952 | Connolly | 280/261 |
| 2,757,631 | 8/1956 | Truter | 440/12 |
| 3,485,198 | 12/1969 | Matthews | 114/123 |

FOREIGN PATENT DOCUMENTS

| | | | |
|---|---|---|---|
| 264217 | 3/1912 | Fed. Rep. of Germany | 280/261 |
| 1252428 | 12/1960 | France | 440/12 |
| 24620 | of 1907 | United Kingdom | 440/12 |

*Primary Examiner*—Sherman D. Basinger
*Attorney, Agent, or Firm*—Dann, Dorfman, Herrell and Skillman

[57] ABSTRACT

Amphibious vehicle having a pedal assembly coupled to propelling devices. On land the vehicle is propelled by at least one wheel driven by the pedals. The wheel has vanes for use in water. Floats keep the vehicle afloat in water. The pedal assembly is adjustable on the vehicle frame to raise them above the water when afloat. In a second embodiment a separate propeller machanism is coupled to the pedal assembly for use in water.

8 Claims, 8 Drawing Figures

AMPHIBIOUS VEHICLE

FIELD OF THE INVENTION

The objective of this invention is an amphibious vehicle provided with the structure of a bicycle or motorcycle.

SUMMARY OF THE INVENTION

This amphibious vehicle has some features of its own both in respect of the construction and of its handling which provide a fundamental advantage for its use in areas of recreation, close to the coast and/or in aquatic zones such as rivers, reservoirs, etc.

As pointed out already, the vehicle has the structure of a bicycle, with a front wheel and a back wheel which is fitted with resistant elements created by spokes which each have an enlargement, as a minimum at the end in the form of a blade in order to effect the partial propulsion of the vehicle in the water when pedalled.

The structure or frame has, in the area of the wheels, laterally protruding resistant arms each of which conveniently holds the foldable floats which are able to keep the vehicle afloat.

The rear wheel has four or more propulsion blades.

The pedal system can be conveniently displaced or fixed in position, depending on whether the vehicle is being moved on land or by water.

According to one solution, the pedal system can be moved and fixed in place, according to the use to which the vehicle is to be put. The pedal movement system is regulated by a mechanism made up of movable part, in a "U" shaped cross section along a flat and lower thickened section of the structure in the part which actually locks the pedal in to the vehicle.

This U-shaped moveable part forms a solid part with the shaft of the pedal, the movement of the said part being limited by a series of end stops on the thickened section of the chassis.

The locking system of the said part requires the coupling to the said part of a bolt which is introduced through an opening in the thickened section so as to fix the position of the pedal according to the vehicle use.

With this pedal movement mechanism, there must be one or more tensors for the chain, which, according to the different positions of the pedals, regulate and tighten the chain so as to ensure an optimal operation of the vehicle.

Another solution assembles the pedal shaft in an articulated support, along an axis which is parallel to the pedal shaft, to the vehicle structure. This support rotates around the shaft by means of an operating control, so as to allow the pedals to be raised and lowered in relation to the structure of the vehicle.

The pedal shaft has two parallel plates, one for the transmission chain to the drive wheel and the other designed to operate one or more drive propellers by means of a second chain.

Likewise, the mount of the pedal shaft is articulated at one end to the vehicle structure, with the said pedal shaft being fitted in the other end of the mount, while, at a middle point, the said mount is connected to a drive control.

The mount of the pedal shaft is made up of two parallel plates articulated along an intermediate transverse shaft across the vehicle structure. Between the said plates there is, joined at one end, a mounting bushing for the pedal shaft.

The propeller mount is fitted so as to be able to rotate on the pedal shaft.

The operating control consists of a nearly vertical rod fitted so as to rotate in the vehicle structure.

The rod has, from its bottom end, a threaded portion which is fitted into a threaded hole in the pedal shaft mount. This shaft rises or falls, with the pedals and plates, when the rod is turned in one direction or the other.

In the normal position, the propeller or propellers are located below the pedal shaft and are fitted in a perpendicular arm connected to the propeller mount so that the turning action of the pedals is transmitted to the propellers which are placed alongside the rear wheel.

The propeller support mount is connected to its other, upper, end by a lever provided in the structure close to the handlebar, by means of a bar, so as to raise or lower the propellers by turning the mounting with the lever.

Each of the floats is connected with the structure of the vehicle by means of an upper folding arm, articulated at one end on the float and, at the other, on the structure.

Likewise, the float is connected to the vehicle structure by a lower fixed arm, articulated at one end to the float at a point within the articulation point of the top arm, and by the other to the vehicle structure at a point below the articulation point of the said larger arm.

As is to be expected, it is possible to add other means of propulsion such as a combustion or electric motor, or the fitting at the rear, close to the seat, of a rotary part which can join with wind force in the vehicle drive.

BRIEF DESCRIPTION OF THE INVENTION

In order to better understand the vehicle, and with the aim of easily understanding the operation, as well as the specifications of each one of the parts, the following is a description of a practical version although of a purely illustrative nature, in no way limiting upon the invention, and with reference to the attached drawings in which.

DESCRIPTION OF THE PREFERRED EMBODIMENTS

Figure 1:
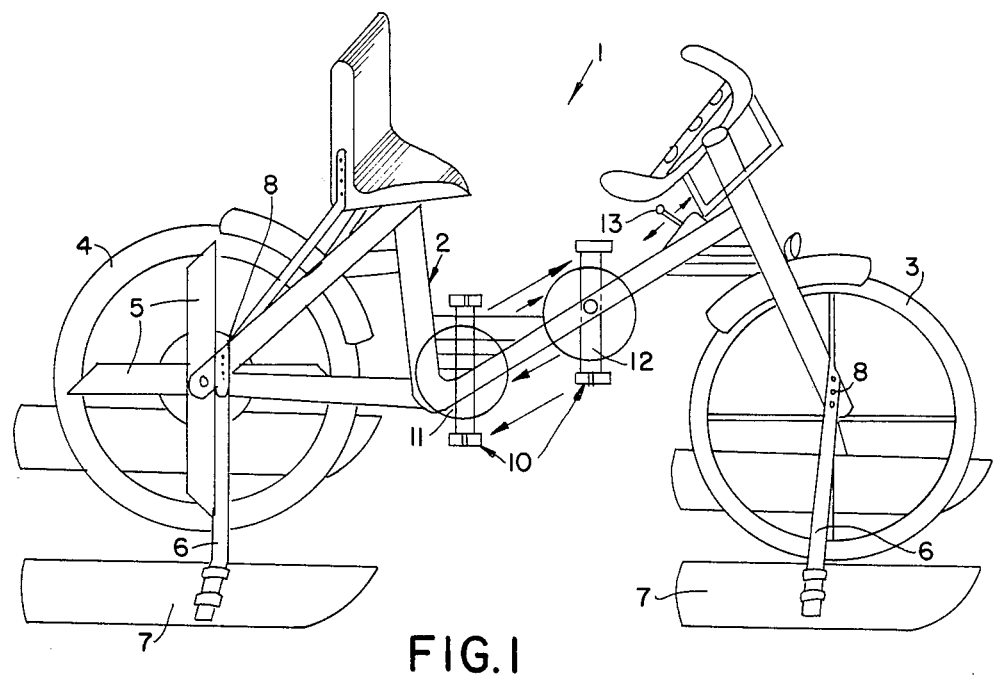
FIG. 1 shows a perspective view of the vehicle ready to sail.

Vehicle 1 is made up of a structure (2) and two wheels (3 and 4), of which the latter has some radial portions (5) like blades which assist directly in the propulsion of the vehicle when in the water.

From each of the chassis of wheels 3 and 4, there emerge one or more lateral arms (6) with floats (7) on their ends.

Each of these arms has an articulation which makes it possible to fold the said floats and which holds them in place when a securing element is inserted in the holes (8) in the arms.

The structure of vehicle 1 may include a hinge 9 which makes it possible, if necessary, for the chassis to be collapsed and folded.

Two positions of the pedals (10) are shown in FIG. 1. The lower position (11) occurs when the vehicle is running on the road, while the top position (12) occurs when the vehicle is in the water.

The vehicle may have a gear change (13), as well as a case (14) on the handlebars (15) and an instrument panel (16).

Figure 4:
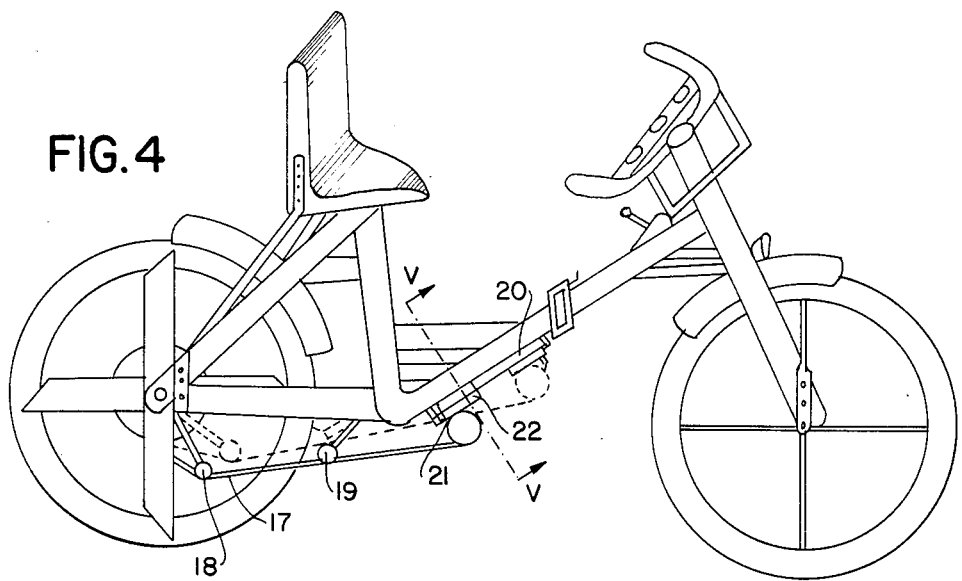
FIG. 4 is a view similar to that of FIG. 3, showing the system of displacement and attachment in the pedal position.
Figure 5:
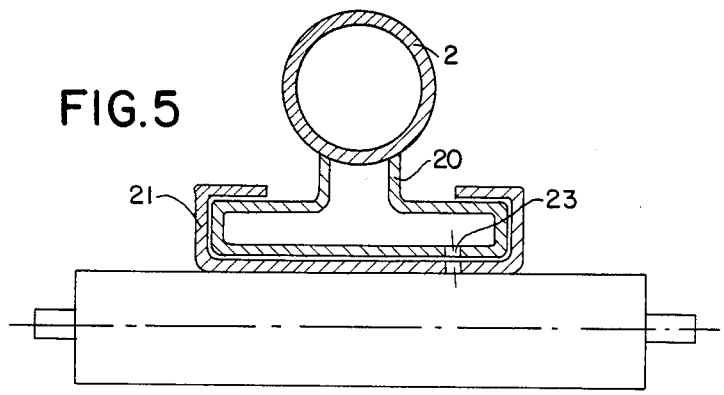
FIG. 5 shows a side and cross-sectioned view along line V—V of FIG. 4.

The position of the vehicle chain (17) is determined according to the position of the plate, although it is also subject to the position of the tensors, shown by way of example by the references 18 and 19 of FIG. 4, one, no. 18, arranged on the vehicle chassis and close to the rear wheel, with no. 19 on the chassis at a point beyond the rear wheel.

The way of moving the pedal (10) in position is with an element or part (20) forming part of some area of the chassis; the bottom of this part is flat and, to it is coupled a runner (21) of U-shaped cross section. The pedal shaft is part of this runner (21).

Figure 2:
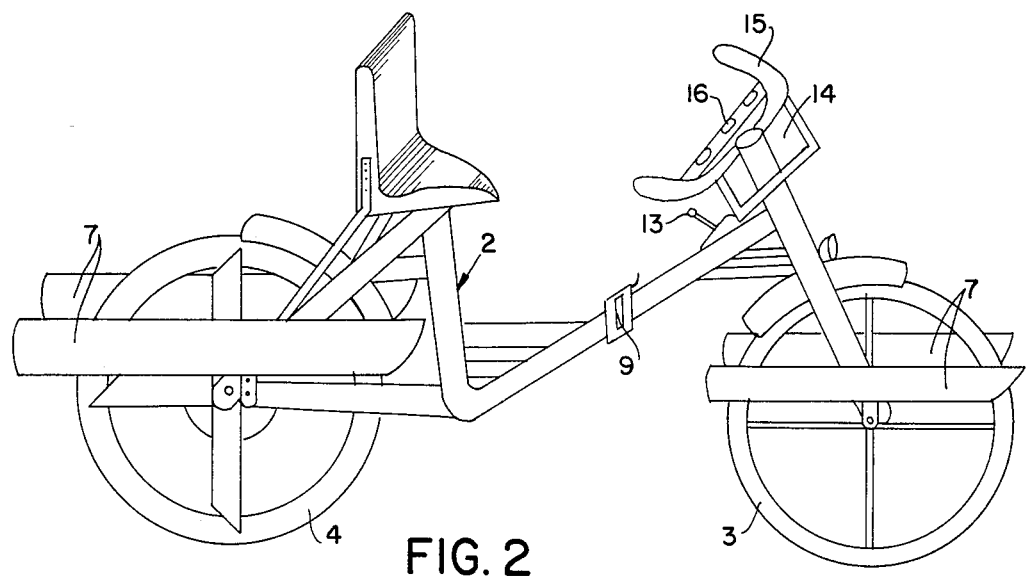
FIG. 2 shows a similar view to that of FIG. 1, but now with the vehicle prepared for road travel. The pedal assembly being omitted for the purpose of illustration.
Figure 3:
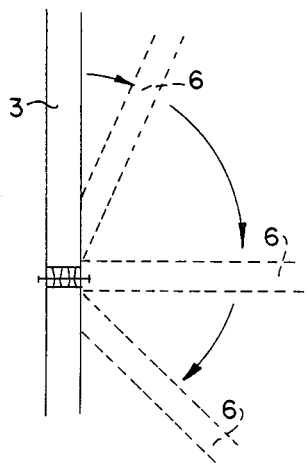
FIG. 3 is a detailed view of the folding of the floats, as in FIG. 2.

The positioning of the pedal is fixed by way of a bolt (22) which couples in a hole (23) in part (20). The pedal assembly is removed in FIGS. 2 and 4 for the purpose of illustration.

According to the position of the pedal, the tensors (18) and (19) will be in the position required to ensure that the chain is adequately tightened and excellent transmission is achieved.

Figure 6:
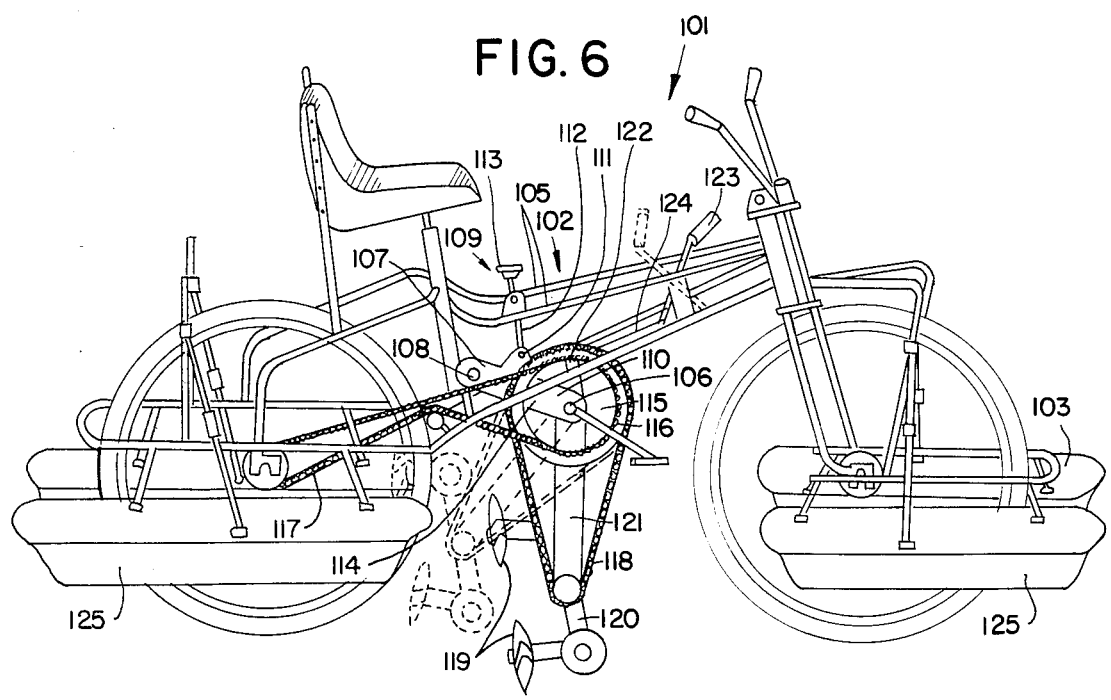
FIG. 6 shows a partial lateral view of a second version of the vehicle.
Figure 7:
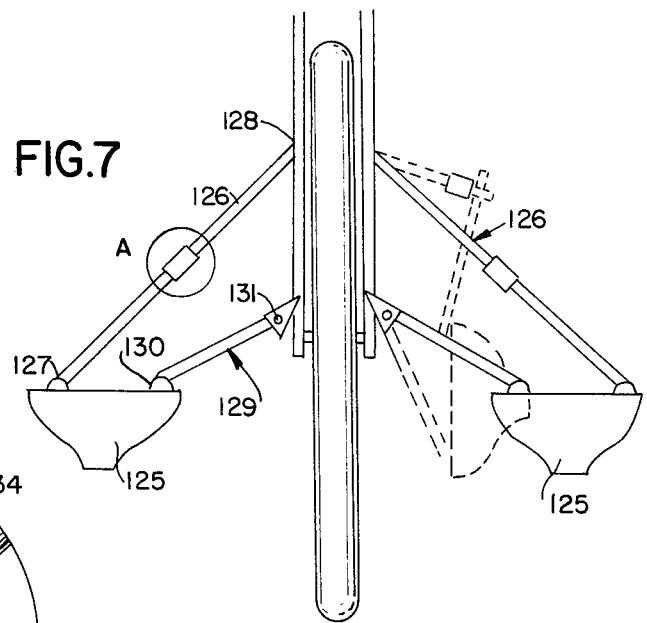
FIG. 7 shows several positions of the floats, according to which use is required for the vehicle shown in FIG. 6.
Figure 8:
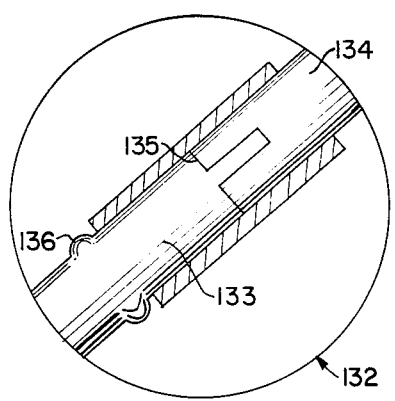
FIG. 8 is an enlarged view of detail A of FIG. 7, showing the articulation of one of the arms of the corresponding structure.

FIGS. 6 and 8, and in particular the former, show amphibious vehicle 101 with a structure 102, particularly that of a bicycle, with a front wheel 103 and a rear wheel 104, and where the bars, 105, are twin and parallel.

The rear wheel, 104 has some radially placed resistant elements, not shown, each of which widens towards its end in the manner of a blade, and which are intended for the partial propulsion of the vehicle.

The pedal shaft, 106, is fitted in a mounting, 107, according to a shaft 108 parallel to the said pedal shaft, and to the vehicle structure.

The mounting 107 turns on the shaft 108 by means of an operating control 109, making it possible to raise and lower the pedals in relation with the structure of the vehicle. The pedal shaft is fitted in the end 110 of the mount, while, at an intermediate point 111, there is a protruding threaded rod 112 attached, which is coupled by a threaded section 113 which serves as a nut and which constitutes the actual operating control.

The mount 107 of the pedal shaft 106 is made up of two parallel plates 114, with two parallel discs, 115 and 116, fitted to the said shaft, one for the transmission chain 117 of the drive wheel 104, and the other for the operation by means of a second chain 118 of at least one propeller, 119.

The propeller or propellers 119 are located under the pedal shaft 106, fitted in the ends of an arm, 120 which is perpendicular to the mount 121, and connected with it in such a way that the rotation of the pedals is transmitted to the propellers which are placed in parallel planes alongside the rear wheel.

The propeller mount 121 is connected by its end, at the top, 122, by a lever, 123, on the structure close to the handlebars, by way of a bar 124 so that, when the lever is operated, the propellers are raised or lowered.

Each of the wheels has a pair of floats 125, each of which is connected to the structure by an upper folding arm 126, articulated at one of its ends 127 to the float 125, and by the other to the structure.

The float is also connected with the structure by way of a bottom fixed arm 129, articulated at its other end 130 to the float, while the other end, 131, articulates it to the structure.

FIG. 8 shows in detail the characteristics of the articulation 132 of the fold made, as required, in the arm 126, which is made up of two poritons 133 and 134, male-female, which are connected by a pin or rivet, not shown.

These two portions, 133 and 134, when in the straight position, are connected by way of a bush 135 on the outside which is impeded in its axial movement in one direction, by the increase in thickness, 136, shown on part 133.

As already pointed out, both the floats and the folding system are shown clearly in FIG. 8, with the two positions which can be adopted when each of the floats is folded.

Having thus sufficiently described the nature of the invention, as well as its practical design, it must be recorded that the foregoing specifications are susceptible of modifications of detail which do not affect the fundamental principles.

I claim:

1. Amphibious vehicle with a bicycle or motorcycle frame, front and rear wheels, the rear wheel comprising a hub, a rim, and resistant elements extending between the hub and the rim and formed as blades at one end, a pedal assembly having a pedal shaft coupled to the hub of the rear wheel which propels the vehicle when the pedals are operated; a chassis for each of the wheels having at least one lateral resistant arm having at its end a float to keep the vehicle afloat, each of the said arms being articulated to permit it to be folded sideways towards the wheel when the vehicle is used as a land vehicle; and adjustable means mounting the pedal assembly on the chassis frame with the rotary axis of the pedal shaft in one of a lower and an upper position depending on whether the vehicle is to run on land or on water, respectively, said adjustable mounting means including a bush rotatably mounting the pedal shaft, and a part of "U" shaped cross section, said frame having an enlargement engaging said U-shaped part and extending between two end stops on the frame; and a bolt to fix the position of the pedal-shaft-mounting bush on said frame enlargement, the pedal assembly having tensor to adjust the tension on said chain to ensure proper coupling of pedal shaft to the rear hub.

2. Amphibious vehicle with a bicycle or motorcycle frame, front and rear wheels, the rear wheel comprising a hub, a rim, and resistant elements extending between the hub and the rim and formed as blades at one end, a chassis for each of the wheels having at least one lateral resistant arm having at its end a float to keep the vehicle afloat, each of the said arms being articulated to permit it to be folded sideways towards the wheel when the vehicle is used as a land vehicle, a pedal assembly having a pedal shaft mounted on a part having a pivotal axis parallel to the said shaft and pivotal on the vehicle frame, the part being pivoted to permit the raising and lowering of the pedal shaft in relation to the frame of the vehicle and adjustable means mounting the pedal assembly pivotal part on the vehicle frame with the rotary axis of the pedal shaft in one of a lower and an upper position depending on whether the vehicle is to run on land or on water, respectively; the pedal assembly including on the shaft two parallel discs, one transmission chain coupling one disc to the rear wheel hub, a propeller, and a second chain coupling the second disc to the propeller to propel the vehicle when the pedal shaft is operated.

3. A vehicle according to claim 2 wherein the pedal shaft mounting part is pivoted at one end to the vehicle structure, with the said pedal shaft rotatable in the other end of the mounting part, at an intermediate point the said mount having a connection to a drive control for determining the position of said pedal shaft.

4. A vehicle according to claim 3 wherein the mounting part comprises two parallel plates between which there is, at one end, a mounting bush for the pedal shaft in which the pedal shaft is rotatable so as to be able to turn the propeller.

5. A vehicle according to claim 3, wherein the drive control comprises an upright rod mounted to rotate about its longitudinal axis in the structure of the vehicle, and having at the bottom end, a threaded section adapted to engage a threaded hole in the pedal shaft mounting part, so that the said shaft rises and falls, together with the pedals and discs, when the said rod is turned in one direction and the other respectively.

6. A vehicle as per claim 2, wherein the propeller is located under the pedal shaft and is fitted in a perpendicular arm which is connected to a propeller mount so that the pedal movement is transmitted to the propeller alongside the rear wheel.

7. A vehicle according to claim 6, having handlebars with a lever close by, said propeller mount being connected to said lever by a connecting rod, so as to raise and lower the propeller by turning the mount with the lever.

8. A vehicle according to claim 2, wherein each of the floats is connected to the structure of the vehicle by a top folding arm pivotally connected at one end to the float and at the other end to the structure, and by at least two bottom fixed arms which are pivotally connected at one end to the float and, at the other end, to the vehicle structure, at a point situated under the point of pivotal connection of the said top arm.

* * * * *